United States Patent [19]

Dixon et al.

[11] Patent Number: 4,859,403
[45] Date of Patent: Aug. 22, 1989

[54] FEEDWATER SPARGER RESTRAINT

[75] Inventors: Robert C. Dixon, Morgan Hill; Gerald A. Deaver, San Jose, both of Calif.

[73] Assignee: General Electric Company, San Jose, Calif.

[21] Appl. No.: 102,444

[22] Filed: Sep. 29, 1987

[51] Int. Cl.$^4$ ............................................. G21C 15/00
[52] U.S. Cl. .................................. 376/286; 376/352; 137/375; 138/99
[58] Field of Search ............... 376/352, 377, 286, 285; 137/375, 312; 138/99, 178

[56] References Cited

U.S. PATENT DOCUMENTS

| | | | |
|---|---|---|---|
| 1,045,376 | 11/1912 | Doellner | 138/99 |
| 1,108,840 | 8/1914 | Franke | 137/375 |
| 3,258,822 | 7/1966 | Schlesch et al. | 138/99 |
| 3,367,358 | 2/1968 | Rentschler | 137/375 |
| 4,139,026 | 2/1979 | Zack | 138/99 |
| 4,212,594 | 7/1980 | Sheer, Jr. | 376/352 |
| 4,259,156 | 3/1981 | Neuenfeldt et al. | 376/286 |
| 4,576,784 | 3/1986 | Kobayashi | 376/377 |

FOREIGN PATENT DOCUMENTS

| | | | |
|---|---|---|---|
| 0076292 | 7/1978 | Japan | 376/286 |
| 0113986 | 10/1978 | Japan | 376/352 |

Primary Examiner—Brooks H. Hunt
Assistant Examiner—Daniel Wasil
Attorney, Agent, or Firm—Robert R. Schroeder

[57] ABSTRACT

A restraint to enable temporary bracing and operation of a thermally cracked sparger nozzle mounted from a sparger manifold at the end of a pipe elbow is disclosed. The restraint includes a second and surrounding restraint elbow which is fitted over and captures the sparger elbow. The restraint elbow has a saddle surface baseplate communicated to the lower end which rest on the sparger manifold to form a substantially water tight base for the restraint. The nozzle end of the restraint elbow is fitted with a nozzle aperture plate for surrounding the outside of the sparger nozzle again in substantially water tight relation. The plate is mounted for movement on the end of the restraint elbow for conforming threading of the restraint at the plate over the sparger nozzle. The restraint can be rapidly mounted (in less than a minute), tack welded at the aperture and seat tensioning bold (in less than 4 minutes) and left in the reactor for a complete fuel cycle. With the restraint mounted, cracked and defective sparger nozzles are restrained in place while a replacement sparger is fabricated.

8 Claims, 5 Drawing Sheets

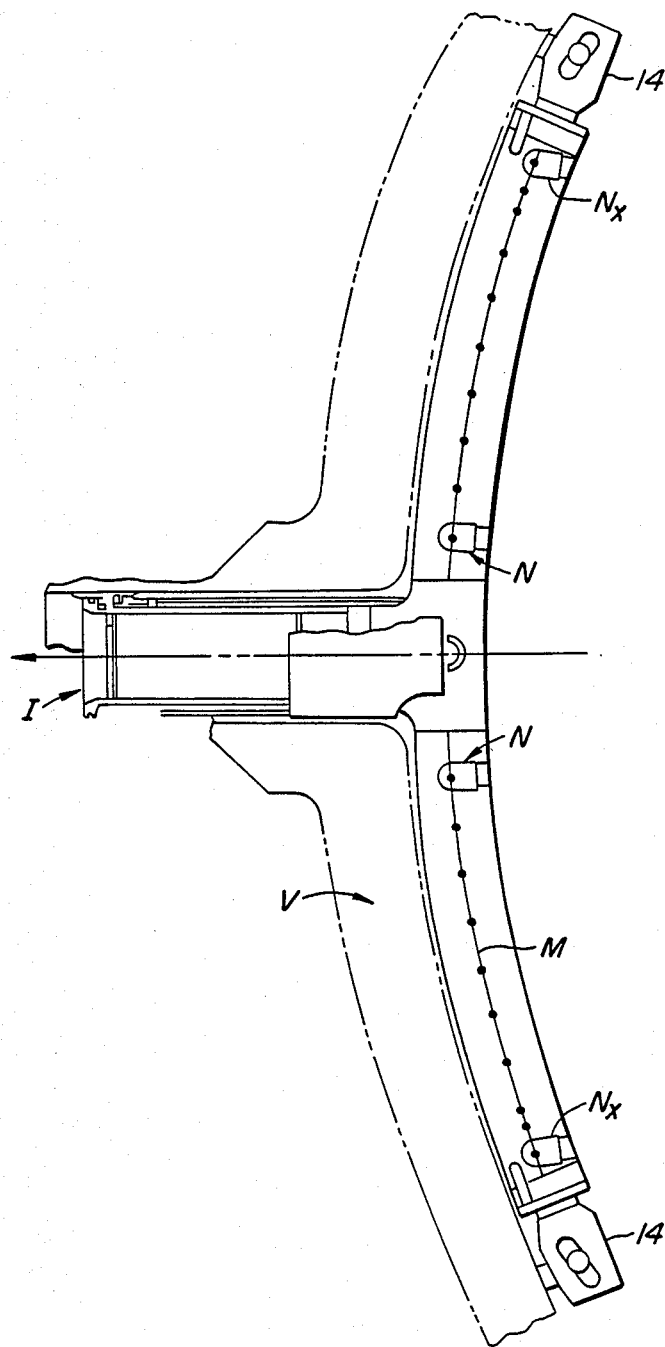
FIG._1. (PRIOR ART)

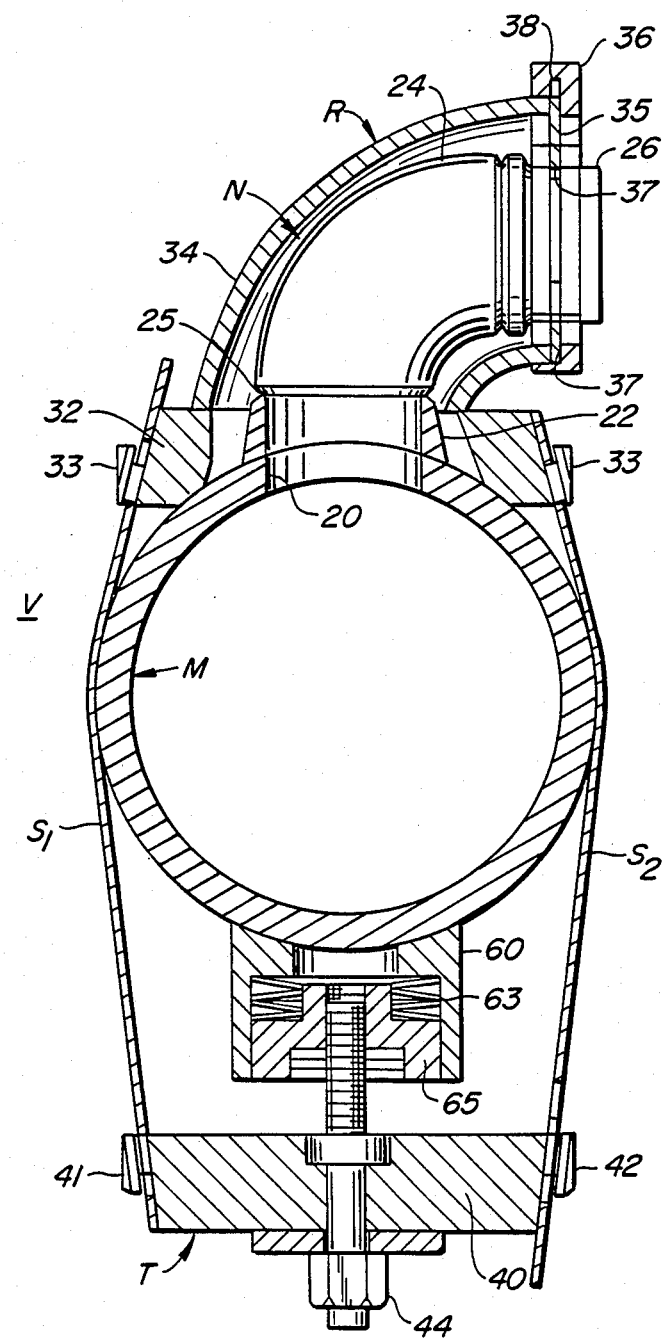
FIG._2A.

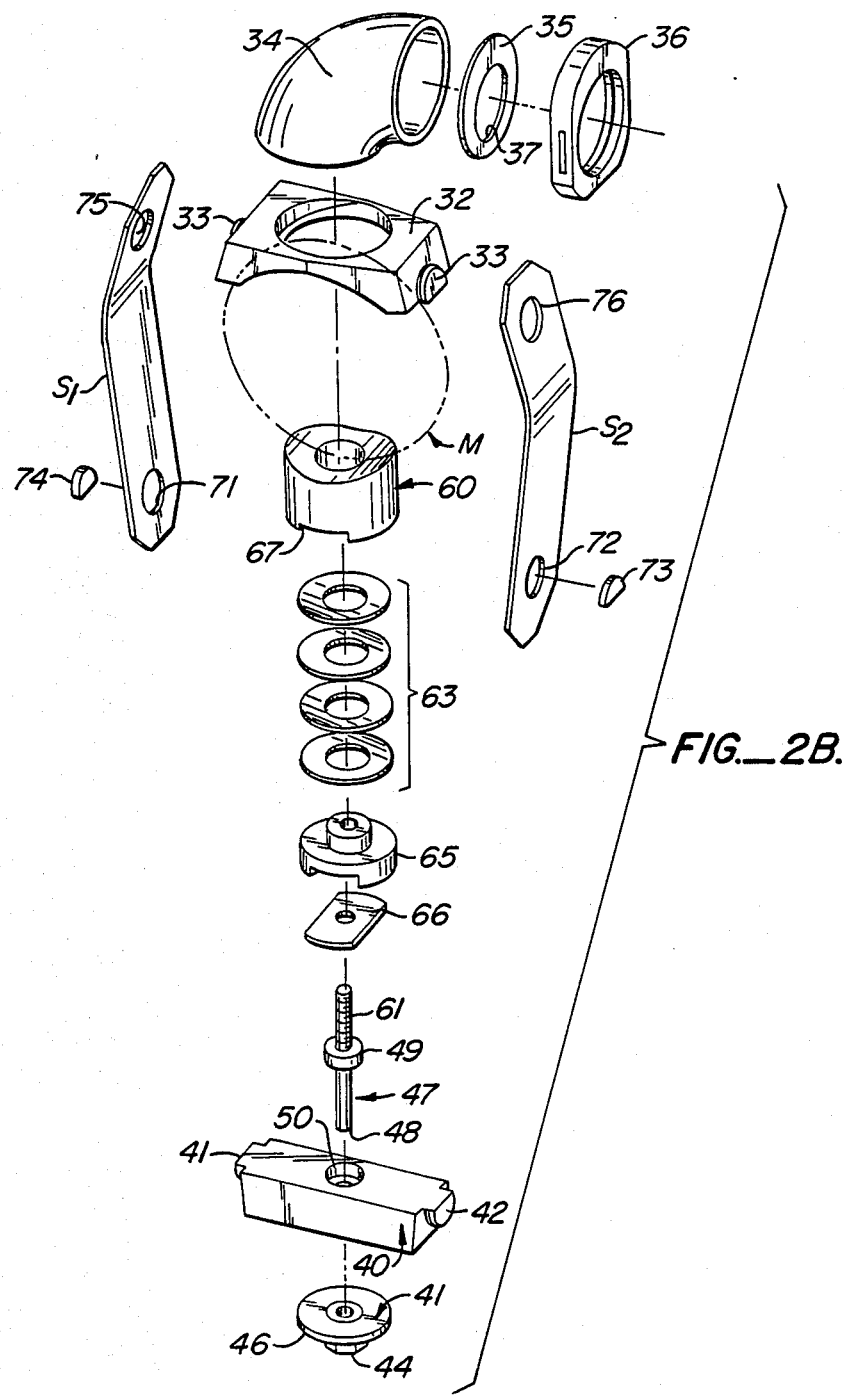
FIG._2B.

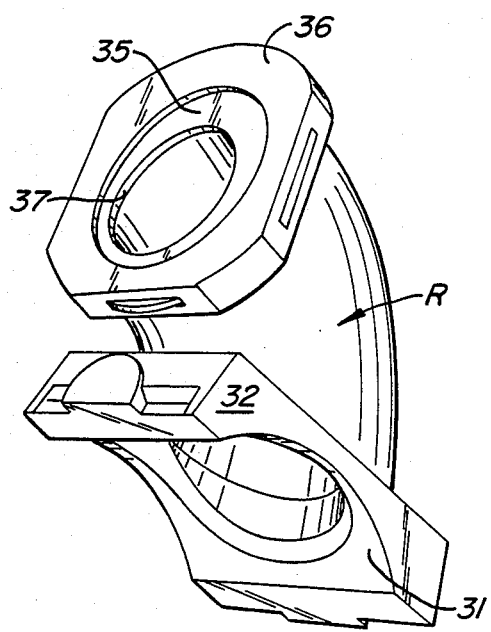
FIG._3.
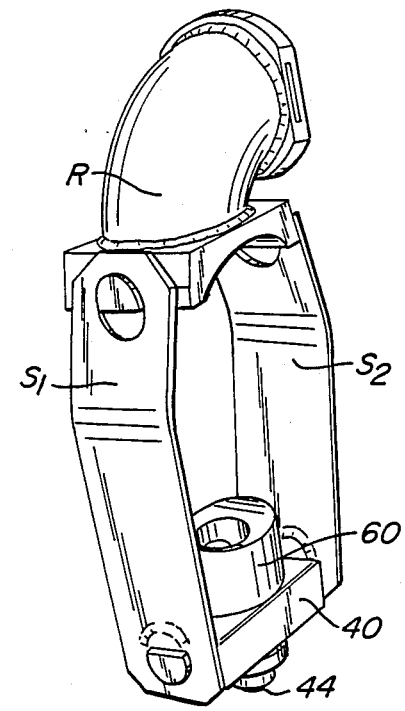
FIG._4.
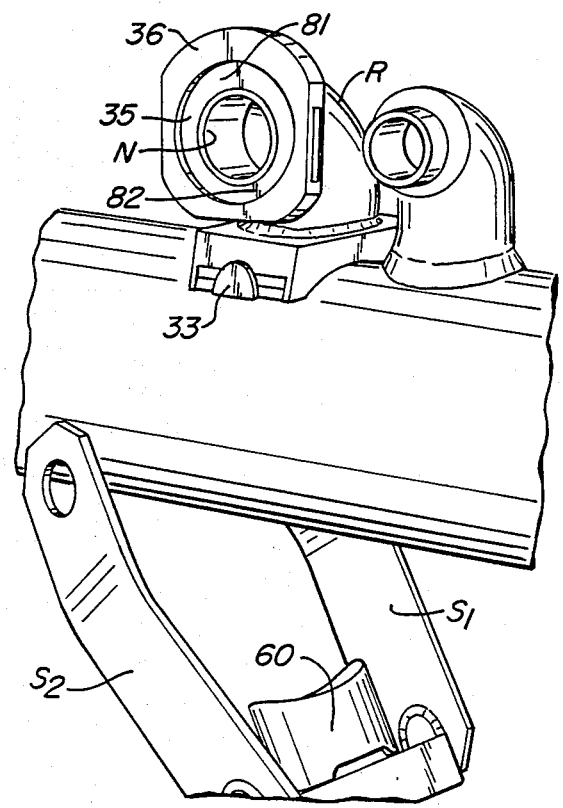
FIG._5.
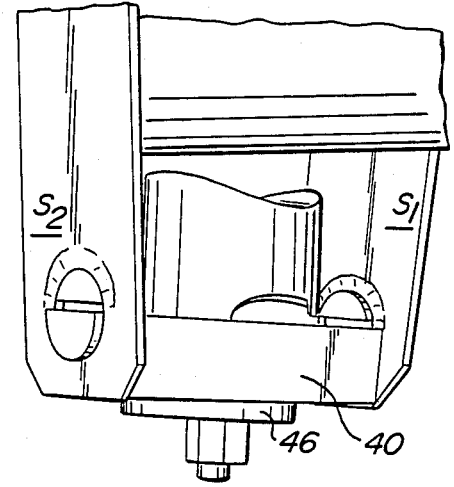
FIG._6.

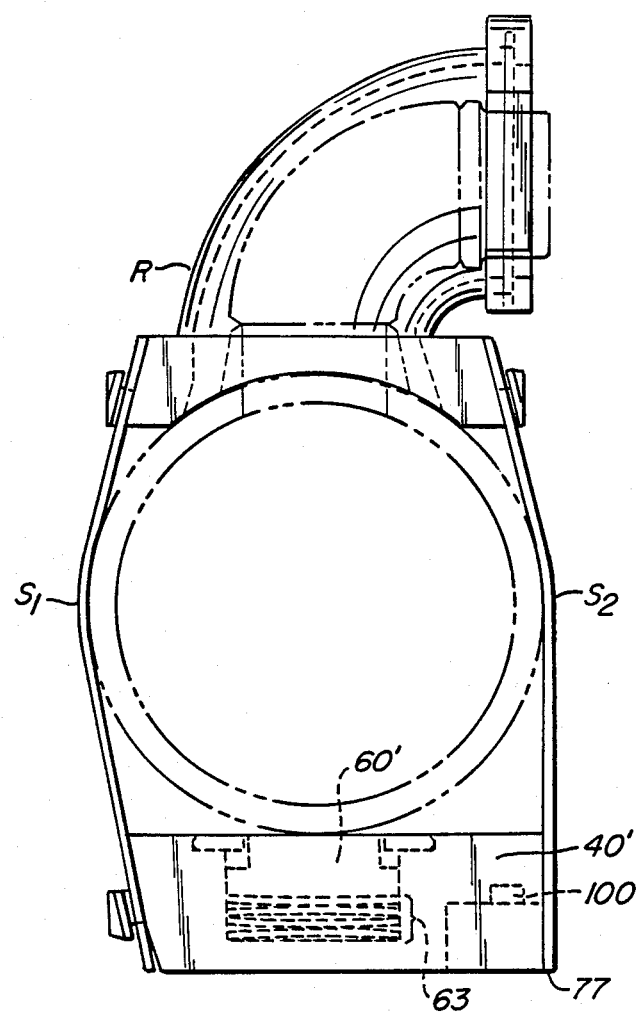
FIG._7.

FEEDWATER SPARGER RESTRAINT

This invention relates to the introduction of feedwater into a reactor. More particularly a restraint is disclosed for a feedwater sparger nozzle on a boiling water reactor (BWR).

STATEMENT OF THE PROBLEM

In a boiling water reactor, feedwater is introduced through nozzles in the side of the reactor pressure vessel. Because of the temperature difference between the introduced feedwater (about 350° F.) and the water circulating interior of the reactor (about 525° F.) the feedwater needs to be disbursed within the circulating reactor water. A manifold type distributor known as a feedwater sparger introduces the feedwater into the reactor.

The feedwater sparger distributes feedwater circumferentially around the reactor, directing the introduced feedwater away from the reactor sidewalls. The feedwater is injected shortly before water circulating interior of the reactor is drawn under suction within the reactor jet pumps. This introduction causes the feedwater to be mixed throughout the normally circulating water in the reactor. Once the feedwater is mixed with the normally circulating water, the mixed water is pumped downward by the jet pumps and then passes upwardly through the core for the extraction of heat energy.

The spargers usually consist of anywhere between four and six arcuate manifolds. These manifolds received feedwater through the reactor vessel wall and communicate to numerous sparger nozzles. It is the thermal stressing of these sparger nozzles that constitutes the problem addressed by the invention herein.

The sparger nozzles are mainly pipe elbows. The pipe elbows connect to the manifold at their lower end. These elbows stand vertically on and are supported by the manifold. The pipe elbows of the sparger are oriented to direct the sparger feedwater radially of the circular sectioned reactor away from the reactor sidewalls.

The upper end of the elbow supports the nozzle for the discharge of feedwater. This nozzle can be of different orifice sizes dependent upon the flow desired both locally at the nozzle and by hydraulic equilibrium at all the remaining nozzles. For example, four separate nozzle orifice sizes are not uncommon.

The sparger is located somewhat above the intake to the reactor jet pumps. The reactor jet pumps cause the water in the reactor to circulate downward to the entrance of the reactor core, upwardly through the reactor core for the generation of steam and then to and towards the reactor steam separator and steam dryers for the discharge of the generated steam.

One of the primary motivations for the installation of the sparger is to prevent thermal cycling of the reactor vessel sidewalls. Since the reactor vessel is the primary containment vessel of the reactor, local variations in the sidewall temperature is not desired. Consequently, the sparger directs newly introduced and lower temperature feedwater away from the reactor sidewalls.

Unfortunately, spargers do not operate at a steady state. They operate as feedwater is needed. Intermittent feedwater flow through the sparger results. Such intermittent feedwater flow is especially common during reactor start-up as well as during changes in the reactor power output.

It is during such changes in feedwater flow that thermal cycling of the sparger nozzles can occur.

Assuming feedwater flow occurs into the reactor at a constant rate, sparger thermal cycling will not occur. When, however, feedwater flow stops and starts into the reactor at varying rates, sparger thermal cycling will occur. Specifically, when the feedwater flow stops, water circulating interior of the reactor ofttimes enters the sparger nozzle in the reverse direction. This entering circulating water passes through the nozzle elbow to and towards the sparger manifold.

The feedwater normally outflowing from the reactor nozzles is heated in the range of 350° F. This feedwater can also be as low as 100° F. in the startup, low flow condition. The water within the reactor is in the range of 525° F. As the circulating water in the reactor passes into and out of the sparger nozzles, the sparger nozzles are thermally cycled. Such thermal cycling can and does cause cracking of the sparger nozzles, especially where the nozzles join the manifold.

This tendency to thermally cycle and crack the sparger is especially present in sparger manifold which were not heat relieved after original welding. Consequently, residual weld stress reduce the fatigue life of the sparger nozzles.

Sparger nozzle arrays such as that illustrated in FIG. 1 are expensive, costing in the range of $1,000,000 1978 dollars for a reactor. Consequently, it is not a usual practice to inventory spare spargers. The costs of carrying such inventory for indefinite lengths of time until cracking may be observed is not practicable.

SUMMARY OF THE INVENTION

A restraint to enable temporary bracing and operation of a thermally cracked sparger nozzle mounted from a sparger manifold at the end of a pipe elbow is disclosed. The restraint includes a second and surrounding restraint elbow which is threaded over and captures the sparger elbow. The restraint elbow has a saddle surface baseplate communicated to the lower end which rest on the sparger manifold to form a leak resistant base for the restraint. The nozzle end of the restraint elbow is fitted with a nozzle aperture plate for surrounding the outside of the sparger nozzle again in substantially water tight relation. The plate is mounted for movement on the end of the restraint elbow such that the plate can be inserted over the sparger nozzle. Bracing of the restraint occurs at paired tension straps on opposite sides of the manifold. These straps extend down to and are captured by a Belleville spring tensioned seat. A counter acting bolt pretensions the seat against the Belleville spring and through the straps and secures the restraint so that load is maintained despite thermal excursion of the nozzle. The restraint can be rapidly mounted (in less than a minute), tack welded at the aperture and seat tensioning bolt (in less than 3 minutes) and left in the reactor for a complete fuel cycle. With the restraint mounted, cracked and defective sparger nozzles are securely captured in place while a replacement sparger is fabricated.

OTHER OBJECTS AND ADVANTAGES

An object of this invention is to disclose a simple and rapidly constructed sparger nozzle restraint for enabling a sparger with observed cracking to be quickly braced during a reactor outage. Accordingly, the disclosed design consists of readily available standard piping and machinery parts which are readily assembled for use in a matter of weeks. The assembled restraint can thereafter be used during the very reactor outage in which the cracking was first observed without undue delay.

A further object of this invention is to provide a restraint that can be installed to a sparger nozzle in minimum time.

Another object of this invention is to disclose a restraint designed to permit operation of a cracked sparger nozzle for one fuel cycle. This use of the restraint on the sparger nozzle for one fuel cycle allows the time interval of the fuel cycle to be use for fabrication of replacement spargers.

BRIEF DESCRIPTION OF THE DRAWINGS

Other objects, features and advantages of this invention will become more apparent after referring to the following specification and attached drawings in which:

FIG. 1 is plan view in horizontal section of the prior art illustrating a portion of a reactor adjacent the reactor vessel wall having a typical feedwater sparger manifold and showing the introduction of feedwater radially interior of the reactor from a plurality of sparger nozzle;

FIG. 2A is a side elevation section of the feedwater sparger manifold at a sparger nozzle illustrating the attachment of the sparger nozzle restraint of this invention;

FIG. 2B is an exploded view of the sparger nozzle restraint illustrating its discrete components.

FIG. 3 is a perspective view of the restraint elbow saddle and nozzle plate shown without placement over the sparger nozzle;

FIG. 4 a perspective view of the sparger restraint assembled before placement on a sparger nozzle;

FIG. 5 a perspective view of the sparger restraint being placed- over a sparger nozzle;

FIG. 6 is a view of the tensioning seat and bolt for sparger attachment; and

FIG. 7 is a side elevation similar to FIG. 2 illustrating an alternate embodiment of the sparger restraint for placement adjacent a core spray pipe support that reduces underlying clearance and prevents use of the locking bolt mechanism.

Referring to FIG. 1, reactor vessel V is shown in the vicinity of the sidewalls only in a 60° section for the illustration of a single sparger manifold M. Inlet I sends feedwater interior of manifold M. Water from the interior of manifold M is fed to upwardly extending elbow nozzles N. Nozzles N cause the projection of feedwater in a substantially radial direction.

Water within the reactor is normally 525° F. The feedwater injected at inlet I is in the range of 350° F. Moreover, the feedwater injection rate is not a steady state: feedwater flow can be intermittent. This is especially true during reactor start-up and changes in reactor power output.

This being the case, it has been found that the nozzles N are subject to thermal cycling. For example, where the water flow at inlet I is slow or has stopped altogether, nozzles N heat to substantially the same temperature as the surrounding reactor water, that is to a temperature range in the order of 525° F. Where, however, feedwater rapidly flows through the sparger nozzles, cooling of the nozzles occurs. The nozzle cools into the range of the injected feedwater, that is around 350° F. Where the nozzle is subjected to such thermal cycling and particularly where the original weld has not been stress relieved, cracking has been known to develop. A site of such cracking is at the lower weld of the nozzle end to the manifold M.

Assuming that such cracking would become complete and the nozzle would become detached from the manifold M, numerous disadvantages will occur.

First, the nozzle N will become a loose part in the reactor, an undesired condition.

Secondly, the feedwater, instead of being directed radially inward and away from the reactor vessel V sidewall will pass parallel to and along the reactor vessel wall. Thermal cycling of the reactor vessel side wall could occur.

Further, all of the nozzles N are sized to provide at each nozzle N a desired flow rate for the injection of feedwater. When one nozzle N is removed from the manifold, the designed distribution of feedwater to the remaining nozzles N will change.

Finally, the illustrated sparger apparatus is expensive, costing in the order of $1,000,000 1978 dollars for a reactor. Moreover, reactor down time is notoriously expensive. Such down time costs in the order of $1,000,000 a day.

The solution here adopted will be seen to fit these respective considerations. What follows is the description of a sparger restraint mechanism.

Once cracking is identified by underwater remote television observation, the reactor is drained down to the level of the sparger. Standard radioactive material procedures are taken including hydrolazing the exposed reactor surfaces and placing appropriate radiation shields interior of the reactor. Thereafter, the disclosed sparger restraints are placed on at least all nozzles exhibiting either cracks or having a tendency to crack.

Once installation has occurred, the shielding is removed and the reactor continues normal operation for one full cycle. During this normal operation, a replacement sparger is fabricated. Upon the next regularly scheduled outage, the sparger is replaced. Naturally, the restraints herein illustrated are no longer utilized and are discarded with the old sparger.

It can be seen that the restraint mechanism herein illustrated allows normal operation of a sparger while a replacement sparger is fabricated. Replacement spargers do not have to be carried in inventory at inventory expense extending for over long periods of time.

Having set forth the general problem area with respect to FIG. 1, a nozzle N with a sparger restraint R will now be described with respect to FIGS. 2A and 2B.

Referring to FIG. 2A, a nozzle N is shown in cross section mounted on a manifold M. Manifold M has exit points at the top of the pipe 20. Water is therefore permitted to flow from the interior of the manifold to a boss 22. Boss 22 is welded to manifold M at the bottom. Likewise, boss 22 is welded to the bottom of elbow 24 at the top of the boss. Nozzle orifice 26 is welded on the upper end of elbow 24 and projects feedwater radially away from wall V of the reactor.

It is the weld 25 which can be one of the sites of thermal cracking with resultant loss of the nozzle N from the manifold M.

Having set forth the prior art nozzle N. the restraint R of this invention will be set forth. Restraint R includes an elbow 34. Elbow 34 is inserted by threading over elbow 24 in the installation of the restraint R over nozzle N.

Elbow 34 is welded to a saddle 32 at the bottom end. Saddle 32 includes three major functions.

First, saddle 32 supports restraint elbow 34.

Secondly, saddle 32 provides a substantially leak resistant seal over manifold M. This seal prevents the substantial escape of injected feedwater even though cracking may be so severe as to permit leakage.

Finally, saddle 32 is provided with lugs 33. Lugs 33 are semicircular in shape and allow the upper ends of straps S1 and S2 to firmly brace the restraint R down upon the manifold M. As will hereinafter be seen, the bracing here disclosed is capable of completely supporting nozzle N.

Elbow 34 of restraint R includes a plate retainer 36 with a captured plate 35. Plate 35 is captured within a defined annulus 38. This annulus is between the upper end of elbow 34 and the plate restraint 36. The plate restraint 36 is cut away so as to expose annulus 38.

Plate 35 defines an aperture 37. Aperture 37 fits in a close slip fit around the end of nozzle 26. This close slip fit maintains a substantial water tight seal around the sparger nozzle.

In order to produce the desired flow rates, the reader will understand that nozzles 26 are sized dependent upon their location upon the manifold M. Moreover, and briefly referring to FIG. 1, it can be seen that the end nozzles $N_x$ are directed in a direction that is other than radial. It therefore will be understood that each restraint R will be constructed using the as-built blueprints of the sparger to fit a particular nozzle on the sparger.

Some movement of plate 35 is required during installation of the restraint R over a nozzle. This small amount of movement assures rapid insertion of the restraint elbow 34 over the nozzle elbow 24 with the nozzle 26 being engaged within the aperture 37. Preferably, aperture 37 is slightly eccentric of plate 35 and is provided with an inwardly flared gathering surface for receipt of the nozzle.

Having set forth the restraint R, the straps S1 and S2 and their attached tensioning mechanism T can now be set forth.

Referring further to FIG. 2A, straps S1 and S2 attach at lugs 41. 42 to a tensioning block 40. Block 40 is in turn compressed by a pad 60 away from the bottom of manifold M. It is this compression of block 40 which exerts tension on straps S1, S2 that enables the secure attachment to the restraint.

Moreover, in the rapid installation of the restraint here disclosed, block 40, the straps S1 and S2 and the pad 60 are a unitary assembly which is rapidly fitted over the bottom of the manifold M. fitted onto lugs 33 and tightened. The construction of that unitary assembly will now be set forth.

Referring to FIG. 2B, nut 41, having a hexagonal surface 44 and a protruding disk 46, is welded to a bolt 47 at non-threaded shaft 48 of the bolt. Such welding captures plate 40 between washer 46 and shoulder 49 at shoulder bearing surface 50 interior of plate 42.

Bolt 47 compresses pad 60 against the bottom of manifold M. Bolt 47 has a threaded portion 61. Threaded portion 61 fits into complementary threads interior of nut 65.

Four Belleville spring disks 63 are captured interior of pad 60 by welded retainer 66 in grove 67. Nut 65 is held in fixed angular relation with respect to the bottom of pad 60 by retainer 66. Retainer 66 at its end edges fits into and is welded to notch 67 at the bottom of the pad 60. It can therefore be seen that the assembly including plate 40 and pad 60 will be held together.

Referring further FIG. 2B, and briefly looking at FIG. 5, we prefer to fasten the straps S1, S2 to plate 40. To this end, the straps S1, S2 are provided at their lower end with circular apertures 71. 72. These apertures are fitted over the semicircular lugs 42. Thereafter, semicircular strap pieces 73, 74 are welded at the bottom of the straps S2, S1 at circular apertures 71. 72. Pieces 73. 74 are generally sized so that the straps S1, S2 have limited motion with respect to plate 40. This limited motion enables rapid fitting of the ends of the straps at apertures 75. 76 over the lugs 33.

The reader will recall that the sparger nozzle end and its manifold M are subject to thermal cycling. This being the case, rigid attachment of the restraint R on the manifold M simply cannot be relied upon. Therefore, the Belleville springs 63 are used to preload the tension of the straps S1 to a design limit. This preloading, however, must not relax even though the nozzle N and manifold M undergo thermal expansion and contraction.

The Belleville spring design here disclosed compresses pad 60 to a predetermined tension. Specifically, the dimensions of compression of springs 63 are selected so that when nut 65 is flush and even with the bottom of pad 60, the correct spring tension is achieved. As is apparent, when the device is installed, the installer may place his finger at the junction between the bottom of pad 60 and the nut 65. By tightening at bolt 44 until the two surfaces are even the correct amount of compression is applied on the spring 63 with the correct amount of tension transmitted to straps S1, S2 through plate 42.

Referring to FIG. 3, the restraint R is illustrated. Two important features may be noted.

First, and referring to plate 35, it can be seen that aperture 37 is eccentric with respect to plate 35 and the retainer ring 36. This eccentricity allows the ring 35 to rotate within the restraint 36 to give maximum variation for excursion of aperture 37 during the installation of the restraint R.

Secondly, it can be seen that saddle 32 is provided with an arcuate lower surface 31. This enables mating of saddle 32 with respect to the manifold M in substantial water tight relation.

Referring to FIG. 4, the restraint is shown immediately before assembly. Restraint R is shown here attached by straps S1, S2 to pad 60 through plate 40 and nut 44.

Referring to FIG. 5, restraint R is shown threaded over a nozzle N with the assembly including straps S1, S2 and pad 60 being placed over the lugs 33 as during rapid installation of the restraint over the top of the sparger nozzle N. Such mechanical installation by a relatively skilled reactor personnel relatively unfamiliar with this device includes an installation time of approximately 1 minute.

After installation of the restraint, it is necessary to tack weld the restraint to prevent loosening during reactor operation. Such tack welding occurs in two places.

Referring to FIG. 5, aperture plate 35 is tack welded to ring 36 as by paired tack welds 81. 82. Tack welds 81, 82 lock ring 35 with respect to the nozzle end. Similarly, and referring to FIG. 6, washer 46, nut 41, is tack welded at the side edge of plate 40 to prevent rotation of bolt 47. Tack welding of this assembly is estimated to take a total time period of 3 to 4 minutes.

When a reactor is being serviced during an outage, especially for replacement of spargers, time is of the essence. Assuming an outage cost of $1,000,000 day, each minute consumed in repair is worth approximately $700. It is not uncommon for the section of the feedwater sparger illustrated in FIG. 1 to include 18 nozzles. As six such sparger manifolds M are used within the entirety of a reactor, the restraint mechanism illustrated herein would have to be installed on 108 nozzles. Thus, it is estimated that the restraint mechanism here disclosed will consume 1½ days of installation or outage time in a reactor.

Referring to FIG. 7, it can be seen that restraint R and straps S1 and S2 are held by a modified plate 40.

Modified plate 40, has a pad 60 placed within plate 40 capturing the Belleville springs 63 within the plate. Such a modified plate 40 is necessary where clearance considerations do not enable installation of the bolt 47 between the plate 40 and the pad 60. These clearance considerations can include interference from core spray pipes and their brackets.

Strap S1 is conventionally attached. Strap S2 is not conventionally attached. Instead, a C clamp mechanism (not shown) engages plate 40, at an aperture 100 and registers the bottom 77 of strap S2 with the bottom edge of block 40. This wedging appropriately tensions the captured Belleville springs. Thereafter, conventional welding occurs.

What is claimed is:

1. A restraint for a feedwater sparger nozzle in a reactor having an arcuate sparger manifold with a plurality of sparger pipe elbows communicated to the interior of the sparger manifold at the lower end and extending upwardly and radially inward from the reactor vessel side walls to discharge feedwater radially and horizontally inward through attached sparger nozzles away from the reactor vessel side walls at the upper end, and restraint comprising in combination:
    a restraint elbow for fitting over and encasing said sparger pipe elbow;
    a saddle mounted to said restraint elbow and shaped to fit on said sparger manifold in substantial water tight relation to confine water leaking from said sparger nozzle into the interstices of said restraint elbow;
    means for maintaining said sparger restraint to said sparger nozzle over said manifold; and
    a nozzle plate defining a nozzle receiving aperture mounted to the nozzle end of said restraint elbow, said nozzle plate at said nozzle receiving aperture for fitting immediately to said sparger nozzle and restraining said sparger pipe elbow interior of said restraint elbow.

2. The invention of claim 1 and including means for mounting said nozzle plate loosely to the nozzle end of said restraint elbow to permit movement of said plate at said aperture during fitting of said restraint elbow over and encasing said sparger pipe.

3. The invention of claim 1 and wherein said means for maintaining said sparger restraint to said sparger nozzle includes spring means for maintaining said sparger restraint under constant tension.

4. In combination a feedwater sparger nozzle mounted within a nuclear reactor, said nozzle having an arcuate sparger manifold with a plurality of sparger pipe elbows communicated to the interior of the sparger manifold at the lower end and extending radially inward from the vessel sidewalls to discharge feedwater radially and horizontally from the reactor vessel sidewalls;
    a restraint elbow fitted over and encasing at least one sparger pipe elbow;
    a saddle mounted to said restraint elbow shaped to fit on said sparger manifold in substantial water tight relation to confine leaking from sparger nozzle into the interstices of said restraint elbow;
    means for maintaining said sparger restraint to said sparger nozzle over said manifold; and,
    a nozzle plate mounted to the nozzle end of said restraint elbow, said nozzle plate defining an aperture for receiving said sparger nozzle therethrough and restraining said sparger pipe elbow interior of said restraint elbow.

5. The combination of claim 4 and including first and second lugs on said saddle, said lugs being on opposite sides of said sparger manifold;
    and wherein said means for maintaining said sparger restraint to said sparger nozzle over said manifold includes;
    first and second straps; said straps mounted to said lugs at one end;
    a seat for bearing against said manifold below said pipe on the other end; and
    means connecting said straps to said seat.

6. A process for the temporary repair of feedwater sparger nozzles in a reactor, whereby said sparger nozzles are supported on an arcuate sparger manifold with a plurality of sparger pipe elbows communicated to the interior of said sparger manifold at one end and extending longitudinally of the reactor and radially inward from the reactor vessel sidewalls to discharge feedwater radially and horizontally inward through attached sparger nozzles away from the reactor sidewalls, said process comprising the steps of:
    providing a restraint elbow for fitting over and encasing said sparger pipe elbow;
    providing a saddle for mounting to said restraint elbow and shaped to fit on said sparger manifold in substantial water tight relation to confine water leaking from said sparger nozzle into the interstices of said restraint elbow;
    fitting said restraint elbow to said saddle;
    fitting said restraint elbow and the saddle over said sparger pipe elbows to seat said saddle in said substantial water tight relation; and,
    mounting said saddle across said arcuate sparger manifold to maintain said restraint elbow surrounding said feedwater sparger nozzle.

7. The process of claim 6 and including providing a nozzle plate for mounting to the nozzle end of said restraint elbow, said nozzle plate defining an aperture for receiving said sparger nozzle therethrough;
    providing a mounting fitting enabling said nozzle plate to include excursion within said fitting;
    mounting said fitting and nozzle plate to the nozzle end of said restraint elbow whereby said nozzle plate undergoes excursion at the end of the restraint elbow;
    permitting said excursion of said nozzle plate to occur during fitting of said sparger restraint to said sparger nozzle;
    and permanently mounting said nozzle plate to said fitting when said saddle is on said sparger manifold whereby said sparger nozzle is braced to said sparger restraint.

8. A restraint for a feedwater sparger nozzle in a reactor, said reactor having an arcuate sparger manifold with a plurality of sparger pipe elbows communicated to the interior of the sparger manifold at the lower end and extending upwardly and radially inward from the reactor vessel sidewalls to discharge feedwater radially and horizontally inward through said attached sparger nozzles away from the reactor vessel sidewalls at the upper end, said restraint comprising in combination a sparger restraint assembly; a sparger mounting assembly; said sparger restraint assembly including a restraint elbow for fitting over and encasing said sparger pipe elbow; a saddle mounted to said restraint elbow and shaped to fit on said sparger manifold in substantial water tight relation to confine water leaking from said sparger nozzle into the interstices of said restraint elbow;

a nozzle plate for mounting to the nozzle end of said restraint elbow, said nozzle plate defining an aperture for receiving said nozzle of said sparger;

a fitting for maintaining said nozzle plate over the end of said restraint elbow and permitting movement of said nozzle plate with respect to said restraint elbow;

mounting means including a seat for bearing on said manifold opposite said saddle;

first and second straps attached to said seat;

means on the upper end of said straps for engaging said saddle on opposite sides of said manifold whereby said restraint elbow is held by said mounting means to brace said feedwater sparger nozzle.

* * * * *